United States Patent
Billington et al.

[11] Patent Number: 4,754,866
[45] Date of Patent: Jul. 5, 1988

[54] APPARATUS FOR CONTROLLING THE CONVEYANCE OF ARTICLES

[75] Inventors: Alan J. Billington; Thomas G. Rice, both of Preston, England

[73] Assignee: British Nuclear Fuels plc, Warrington, England

[21] Appl. No.: 914,627

[22] Filed: Oct. 2, 1986

[30] Foreign Application Priority Data

Nov. 18, 1985 [GB] United Kingdom ............ 8528349

[51] Int. Cl.$^4$ .......................................... B65G 47/12
[52] U.S. Cl. ............................ 198/451; 198/463.6; 193/40
[58] Field of Search ............... 198/463.4, 463.6, 633, 198/634, 345, 442, 368, 451; 221/179, 180, 181; 193/40, 35 A; 271/245, 250; 198/463.3, 600; 414/748; 226/48

[56] References Cited

U.S. PATENT DOCUMENTS

| 3,820,648 | 6/1974 | Halvorsen | 198/463.6 X |
| 4,240,538 | 12/1980 | Hawkes et al. | 198/463.6 |
| 4,444,303 | 4/1984 | Burgess, Jr. | 198/345 |

FOREIGN PATENT DOCUMENTS

| 0004953 | 4/1979 | European Pat. Off. . |
| 0063766 | 4/1982 | European Pat. Off. . |
| 1301273 | 12/1972 | United Kingdom . |
| 1519593 | 8/1978 | United Kingdom . |
| 1577408 | 10/1980 | United Kingdom . |

Primary Examiner—Robert J. Spar
Assistant Examiner—Cheryl L. Gastineau
Attorney, Agent, or Firm—William R. Hinds

[57] ABSTRACT

A selector mechanism for controlling transfer of articles from a plurality of upstream feed lines to at least one downstream feed line (104) comprises a plurality of transfer passages (114) each provided with a gate (106) and at least one stop (108). The gates (106) are operable to block the leading article in the respective transfer passages while the stops (108) are operable to arrest movement of a trailing article and hence the articles that follow it. Operation of the gates (106) and stops (108) is co-ordinated so that the stops are operative when the gates are operated to unblock the leading article. In this way, the number of articles freed for onward movement each time the gates are operated to unblock the path of conveyance can be controlled.

9 Claims, 6 Drawing Sheets

APPARATUS FOR CONTROLLING THE CONVEYANCE OF ARTICLES

This invention relates to apparatus for controlling the conveyance of articles.

According to one aspect of the invention there is provided apparatus for conveying articles in a line comprising continuously-operating conveying means and means for arresting movement of the articles while the conveying means continues to operate, the arresting means comprising at least one stop element disposed above the conveying means, each such stop element being operable to engage an article in said line and being arranged for movement towards and away from the conveying means between an inoperative position where movement of the article is not impeded and an operative position where the article is lifted from the conveying means into engagement with a surface overlying the conveying means thereby arresting movement of that article and the trailing articles.

Also in accordance with the invention, there is provided apparatus for controlling transfer of articles from a plurality of upstream feed lines to at least one downstream article-receiving station, said apparatus comprising a plurality of transfer passages each for registry with a respective upstream feed line, a conveyor element running beneath and common to the transfer passages, and a plurality of stop elements each disposed above a respective transfer passage, each stop element being operable to engage an article on the conveyor element and being arraned for movement towards and away from said common conveyor element between an inoperative position where movement of the article is not impeded and an operative position where the article is lifted from the conveyor element into engagement with a surface overlying the conveyor element thereby arresting movement of that article and any trailing articles.

According to a second aspect of the invention there is provided a selector mechanism for controlling transfer of articles from a plurality of upstream feed lines to at least one downstream article-receiving station, said selector mechanism comprising a plurality of transfer passages each for registry with a respective upstream feed line, a plurality of selectively operable gate elements each associated with a respective transfer passage to block or unblock movement of the leading article from each feed line, and at least one stop element associated with at least one of said transfer passages and located upstream of the respective gate element, the or each stop element being disposed above the transfer passage, operable selectively to engage and release a trailing article and arranged for movement between an inoperative position where movement of the trailing article is not impeded and an operative position where the trailing article is lifted into engagement with a surface overlying the transfer passage whereby feed of the trailing article so engaged and the articles upstream thereof can be interrupted while the corresponding gate element is operated to unblock the leading article for movement to said at least one article-receiving station.

The invention also provides a selector mechanism for controlling transfer of articles from a plurality of upstream feed lines to at least one downstream article-receiving station, said selector mechanism comprising a plurality of transfer passage each for registry with a respective upstream feed line, a plurality of selectively operable gate elements each associated with a respective transfer passage to block or unblock movement of the leading article from each feed line, and at least one stop element associated with at least one of said transfer passages and located upstream of the respective gate element, the or each stop element being operable selectively to engage and release a trailing article whereby feed of the trailing article so engaged and the articles upstream thereof can be interrupted while the corresponding gate element is operated to unblock the leading article for movement to said at least one article-receiving station, each stop element being operable to engage the articles and urge the same against a surface to arrest feed movement of an article and those articles following the article so engaged, each stop element including an opening through which the articles can pass when the stop element is inoperative, the arrangement being such that, when the stop element is operative, the opening is displaced laterally relative to the direction of feed movement of the articles thereby displacing an article received in the opening laterally against said surface.

One form of article handling equipment embodying these aspects of the invention will now be described by way of example only with reference to the accompanying drawings in which.

Figure 1:
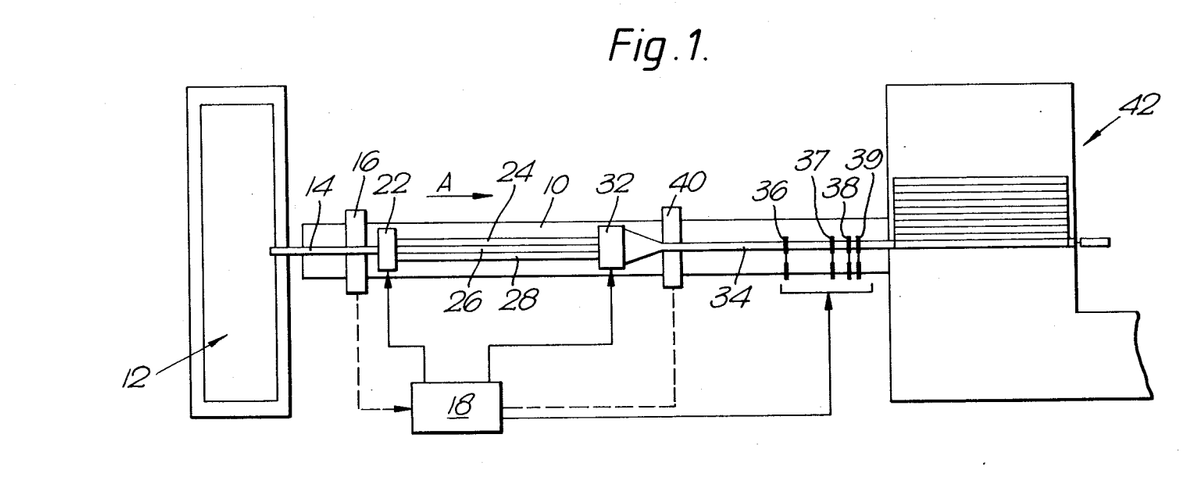
FIG. 1 is a schematic plan view of a pellet stacking apparatus for use in circumstances where all of the pellets are of the same type.

Referring to FIG. 1, pellets are off-loaded from trays onto a moving belt 10 by an off-loader mechanism generally depicted by reference numeral 12. The belt 10 travels in the direction of arrow A and, initially, the pellets travel in spaced relation within the confines of a guide lane 14 and with their axes parallel to the direction of belt movement. The pellets move through a measurement station 16 in which the lengths are measured preferably by a non-contacting method and while the pellets are in motion. The measuring device may be a laser scanning arrangement such as that manufactured under the brand name "Laser Mike" by Techmat Company of 6060 Executive Boulevard, Dayton, Ohio, 45424, USA. The individual measurements are fed to a microprocessor-based control unit 18 which is preprogrammed with data relating to the required overall length of the stack and also the target length of the stack at one or more intermediate points during its assembly.

Figure 2:
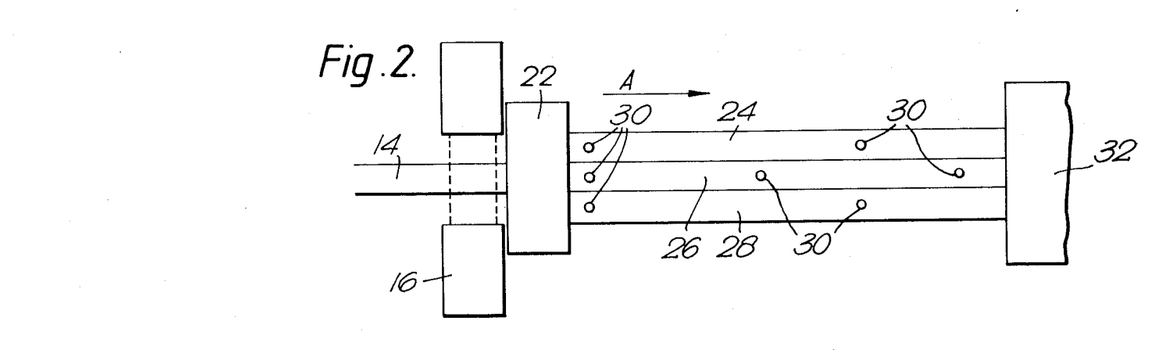
FIG. 2 is an enlarged view of part of the apparatus of FIG. 1.

Depending upon the result of the measurement, each pellet is channelled, under the control of control unit 18, by a diverter mechanism 22 into one of three lanes 24, 26, 28, herein called the oversize, intermediate-size and undersize lanes respectively. The criteria for segregation of the pellets into these lanes will in general be governed by the fact that the stack will be assembled primarily from intermediate-size pellets and the oversize and undersize pellets are principally intended to be used for corrective action in the event that the partially completed stack drifts away from the target length. Thus, the classification of the pellets by the control unit 18 is governed by the need to maintain an adequate supply of intermediate size pellets and the control unit is therefore programmed to update the size ranges corresponding to undersize, oversize and intermediate-size to meet this need. For example, the control unit 18 may be arranged to ensure that say 50% of pellets are channelled to the intermediate-size lane 26 and the remaining 50% are shared between the oversize and undersize lanes 24, 28. For this purpose, the control unit 18 may be arranged to keep an inventory of the pellet distribution between the lanes 24, 26, 28, the size criteria being automatically adjusted when necessary to ensure an adequate supply of pellets in each lane. Alternatively, as illustrated in FIG. 2, instead of an inventory being kept by the control unit 18, the lanes 24, 26, 28 may be provided with sensor means, e.g. photoelectric detectors 30, for providing signals to unit 18 indicating the extent to which each lane is occupied by pellets enabling control unit 18 to divert more or less pellets to each lane automatically by adjusting target lengths.

The lanes 24, 26, 28 direct the respective pellets to a selector mechanism 32 which is controlled by the unit 18 and serves to hold up pellets in the lanes 24, 26, 28 and release them selectively into a single lane 34 constituting the stacking zone of the apparatus. The pellets thus released collect end-to-end in a stack which can be constrained against movement with the belt 10 at various points during formation of the stack by a series of stops 36–39 which are extendable into and retractable from the stacking lane 34 under the control of unit 18. Associated with the stacking lane 34, there is a stack-length measuring system 40 for detecting the position of the trailing end of the growing stack when the latter makes successive contact with each of the stops 36, 37, 38 and 39. The system 40 may, like device 16, be a laser-scanning device having a well-defined scanning field upon which the trailing end of the growing stack eventually encroaches after the stack initially contacts stop 36 and subsequently, in succession, stops 37, 38 and 39.

The microprocessor-based control unit 18 is programmed to co-ordinate the positions of the stops 36–39 with detection of the trailing end of the stack within the field of view of the scanning system 40 and thereby derive length measurements for the partly-completed stack at each of the stop positions 36–39. In this way, length measurements for the stack are obtained at different points in its assembly, e.g. halfway (stop 36), three-fourths completed (stop 37), four pellets from completion (stop 38) and one pellet short of being fully completed (stop 39). Each of these measurements is compared by the unit 18 with corresponding target values so that any drift away from the target length can be detected at various points during assembly of the stack. If any deviation occurs at stops 36–38, the control unit 18 computes the combination of oversize or undersize and/or intermediate size pellets to be supplied to the stack to correct for such drift as the stack continues to grow towards the size at which the next length measurement is taken. The required combination of pellets is released into the stacking lane 34 by appropriate operation of the selector mechanism 32 under the control of unit 18.

After the stack has advanced to the stop 39 and any corrective action has been taken in selecting the appropriate pellet size for completion of the stack, pellet supply into lane 34 is terminated, stop 39 is retracted and the completed stack is transferred to a tray in loading mechanism 42. The completed stack length can be subsequently checked and if it lies outside the acceptable tolerance range the stack may be rejected and the pellets recycled or it may be transferred to a reject tray for corrective action by manual means, using a glove box if the nature of the fuel material demands this. After transfer of the completed stack from lane 34, stop 36 is extended into lane 34 and pellet supply via the selector mechanism is resumed to build-up a fresh stack in the same manner as described above.

Figure 3:
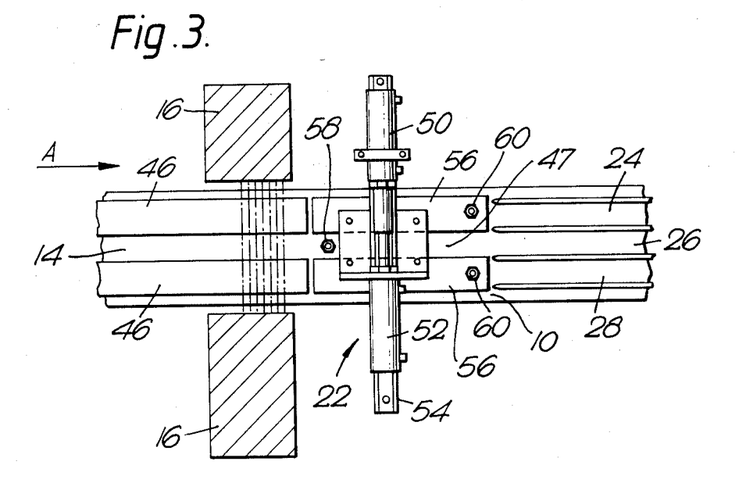
FIG. 3 is a plan view showing one form of pellet diverter mechanism applicable to the embodiment of FIG. 1 and also to the other embodiment described herein.
Figure 4:
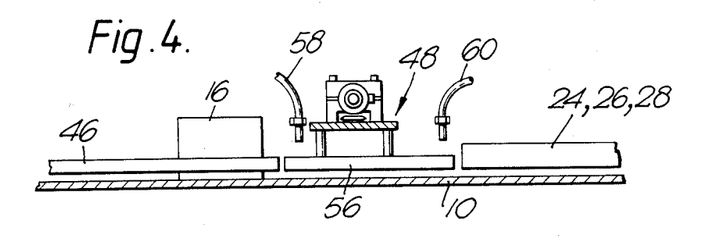
FIG. 4 is a front elevation of the diverter mechanism.
Figure 5:
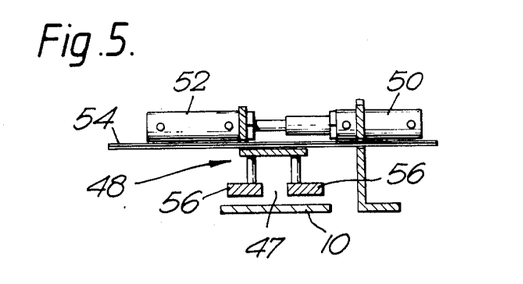
FIG. 5 is an end elevation of the diverter mechanism.

One embodiment of the diverter mechanism 22 is illustrated in FIGS. 3, 4 and 5 to which reference is now made. As mentioned previously, the diverter mechanism 22 is operable to divert pellets in lane 14 (defined by rails 46) to one of the lanes 24, 26 or 28 depending on the result of the measurement made at the device 16. In this embodiment, the diverter mechanism is constructed as a three-position actuator having three well-defined settings in which the guide section 47 of its diverting gate 48 is in registry with lanes 24, 26, 28 respectively. The mechanism comprises a pair of elements 50, 52 having a well-defined stroke length, one (50) of which is fixed and the other (52) of which is slidable transversely of direction A along a slide 54 and carries the diverting gate 48. The two elements 50, 52 are coupled together in such a way that when both are at their minimum stroke settings, the guide section 47 is in registry with the lane 24; when one is at its full stroke setting and the other at its minimum, the section 47 is in registry with the lane 26; and when both are at the full stroke settings, the section 47 is in registry with the lane 28. The elements 50, 52 may for example comprise fluid powered piston and cylinder devices arranged with their piston rods coupled together or they may comprise solenoids arranged with their armatures coupled together.

The diverter mechanism 22 operates under the control of unit 18, the arrangement being such that the guide section 47 defined by rails 56 is normally in registry with lane 14. When a pellet passes through the measuring device 16 it is allowed to continue into the guide section 47 until the pellet is entirely within the section 47 (as registered for example by a suitable sensor 58 connected to the control unit 18) whereupon the gate 48 is shifted (if necessary) to align the section 47 with the appropriate lane 24, 26, 28 so that the pellet can continue without interruption through the section 47 and into the selected lane. After the pellet has cleared the section 47 (as registered by sensors 60 connected to the control unit 18), the gate 48 is restored (if necessary) into alignment with the lane 14 in preparation for receiving the next pellet.

The foregoing description relates to the fabrication of pellet stack in circumstances where all of the pellets are of the same type. However, in some circumstances, it may be necessary to assemble a stack from two or more different types of pellet in such a way that certain types of pellet occupy specific positions along the length of the stack. Thus, fuel for a known form of gas cooled graphite moderated nuclear reactor comprises plain pellets and pellets formed with a circumferential groove into which the sheath of the fuel pin is subsequently deformed to lock the pellet stack axially to the pin. To enable corrective action to be taken to ensure the stack length is within an acceptable tolerance range about the target length, the practice has been to manufacture the plain pellets in two sizes, long and short, so that stack adjustment can be effected by substituting long for short pellets or vice versa.

Figure 6:
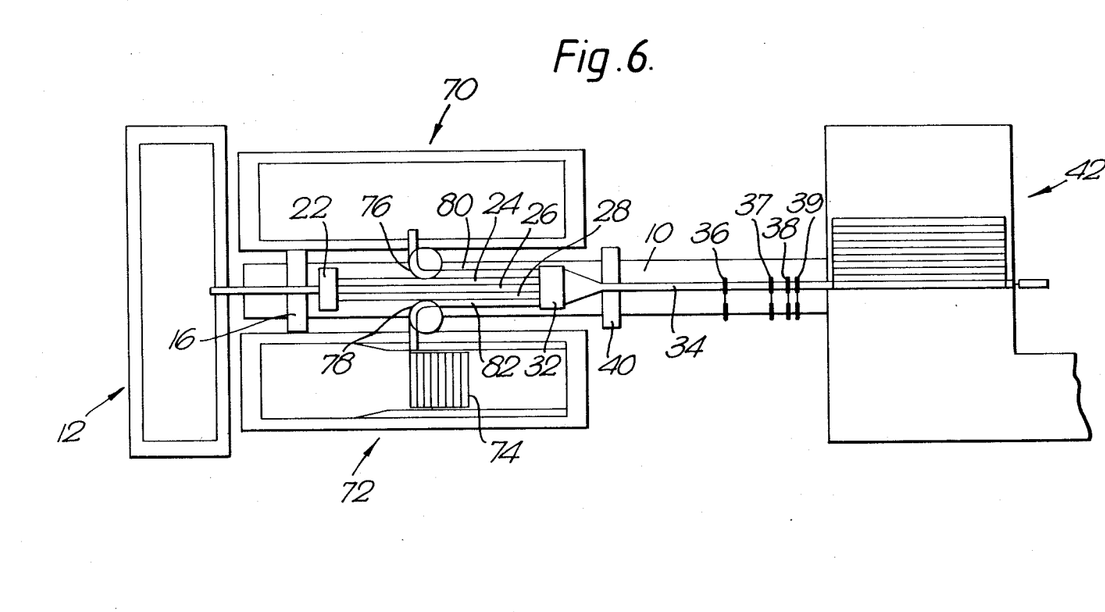
FIG. 6 is a view similar to FIG. 1 but showing an alternative embodiment.
Figure 7:
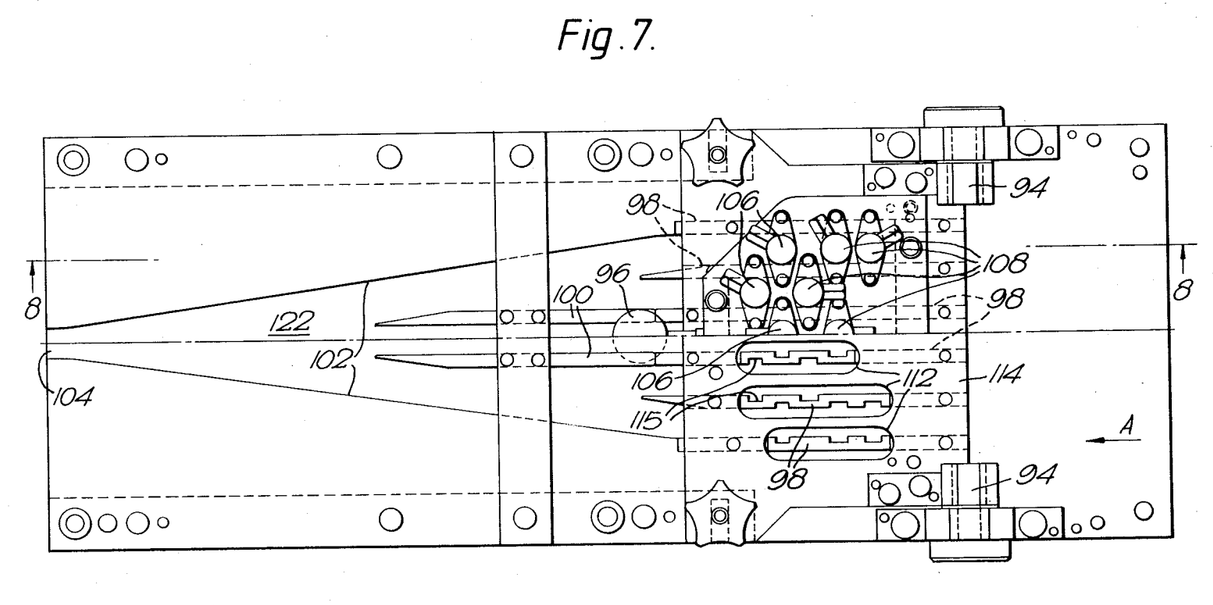
FIG. 7 is a plan view, with parts removed, of a selector mechanism.
Figure 8:
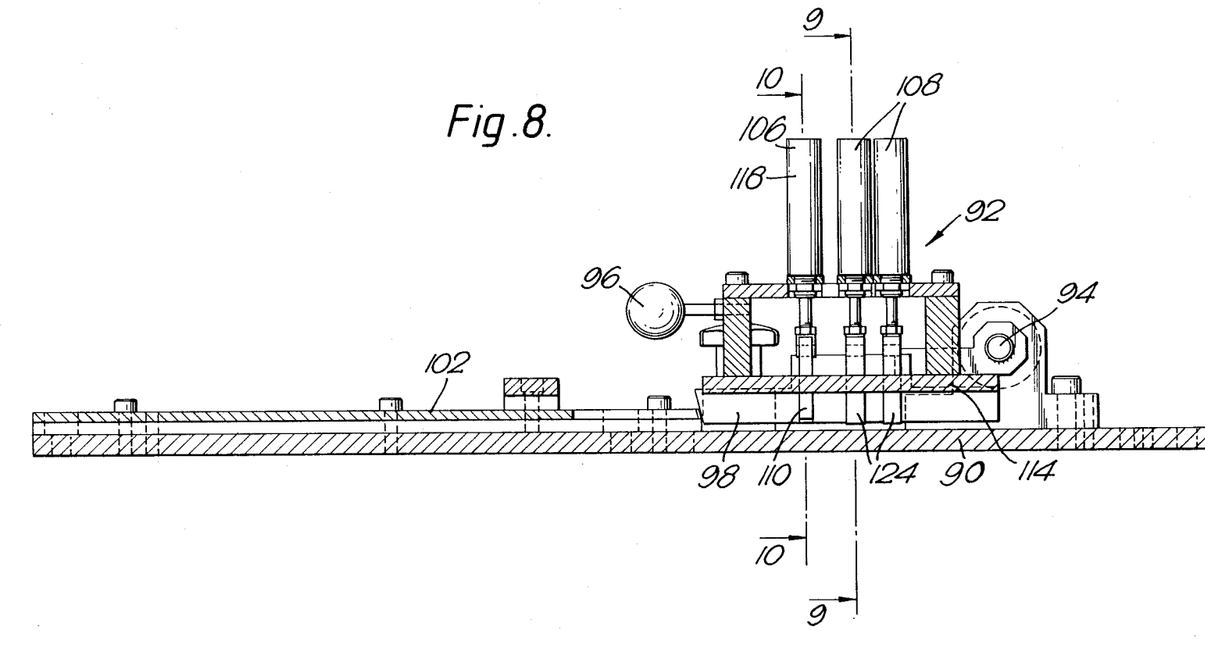
FIG. 8 is a sectional view taken in the direction 8—8 in FIG. 7.
Figure 9:
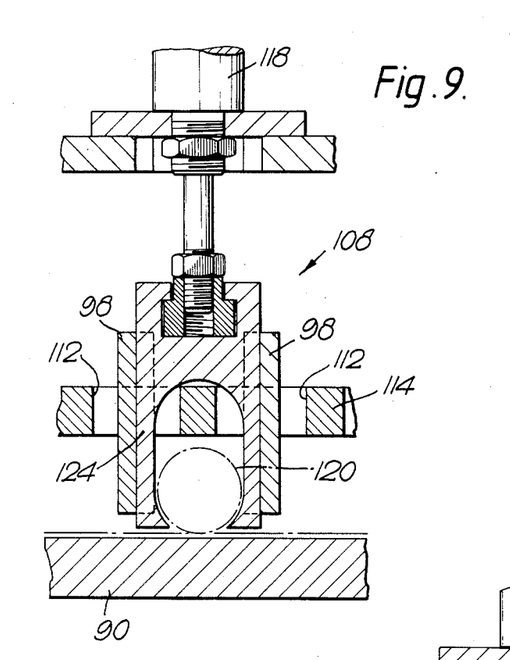
FIG. 9 is a sectional view taken in the direction 9—9 in FIG. 8.

An embodiment of the invention for use in handling pellets in such circumstances is illustrated in FIG. 6. This embodiment is similar to that of FIGS. 1 and 2 in many respects and like reference numerals are therefore used to indicate like components and structures. The control unit 18 and its connections to various parts of the apparatus have been omitted in FIG. 6 for the sake of clarity. The short and long plain pellets are supplied to apparatus via off-loading mechanisms 70, 72 respectively which feed pellets from trays, such as that indicated by reference 74, onto the belt 10 downstream of the diverter mechanism 22 via curved guides 76, 78 which lead into guide lanes 80, 82 running alongside lanes 24, 26, 28 to the selector mechanism 32. The long and short plain pellets are not measured by measuring device 16 since they have already been classified into specific size ranges. The grooved pellets are fed by the off-loading mechanism 12 and follow the route previously described in relation to FIGS. 1 and 2 and consequently lanes 24, 26 and 28 serve to accumulate oversize, undersize and intermediate size grooved pellets, the classification into these size ranges being effected in the manner described previously so as to ensure that an adequate supply of the different grooved pellet sizes is always available.

The stack of pellets formed in stacking lane is assembled by operation of the selector mechanism 32 under the control of unit 18 in accordance with a preprogrammed sequence of long, short and grooved pellets so that the grooved pellets will occupy the desired positions along the length of the fuel pin after insertion of the stack into the sheath. The unit 18 may store a range of different pellet sequences since the sequence may be required to differ from one pin to another and, in this event, the required sequence may be preselected by entry of command data via an operator console of the unit 18.

As the stack grows in lane 34, its length is periodically checked as before by means of the stops 36–39 and the measuring system 40 to detect any drift away from the target length. In this embodiment, the necessary corrective action can be taken by selecting a suitable combination of pellet sizes from the lanes 24, 26, 28, 80, 82 taking into account also the need to secure the correct number and positioning of the grooved pellets along the stack. In practice, the corrective action may only involve the use of the long and short plain pellets following the first and second measurements at stops 36 and 37 and the different grooved pellet sizes may be employed either alone or in combination with long and short plain pellets after the measurement at stop 38 has been made.

One form of selector mechanism for use in the apparatus of FIG. 6 (or in FIG. 1 with modification involving a three lane input instead of five lanes) is shown in FIGS. 7, 8, 9 and 10 to which reference is now made. As shown, the mechanism comprises a base 90 on which a housing structure 92 is pivoted by pivots 94 so that the housing 92 can be pivoted by means of knob 96 between the in-use position shown and a raised position for maintenance purposes. Beneath the housing 92, the base 90 is divided by a set of parallel rails 98 into lanes which, at the right hand side, register with and form continuations of the lanes 24, 26, 28, 80, 82 (not shown). To the left of the housing 92 the lanes are merged by guides 100, 102 into a single lane 104 which registers with the stacking lane 34. For each lane defined by rails 98, the housing 92 mounts a pellet gate 106 and at least one pellet stop 108, the pellet gates 106 being downstream of the pellet stops 108 in the direction A of pellet travel.

Figure 10:
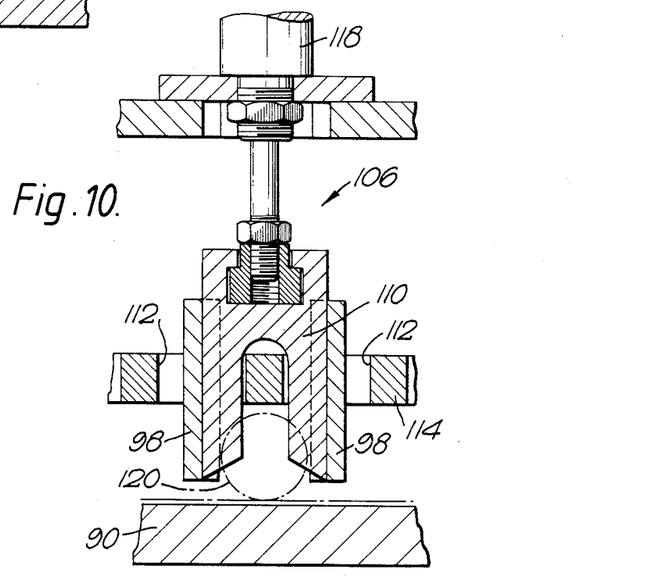
FIG. 10 is a sectional view taken in the direction 10—10 in FIG. 8.

As shown in FIG. 10, each pellet gate 106 comprises a bifurcated vertically displaceable gate plate 110 whose legs project through openings 112 in a support 114 of the housing 92 and slide in grooves 115 in the rails 98 which, in turn, are secured to the underside of the support 114. The plates 110 are each movable under the control of unit 18 by an actuator 118, such as a pneumatic piston and cylinder, between the lowered position shown in which it impedes pellet motion along the respective lane (see pellet 120 in FIG. 10) and a raised position in which it is clear of the pellet and allows passage of the pellets into the converging section 122. The pellet stops 108 are constructed and operate in a similar fashion to the pellet gates 106 except that the bifurcated stop plates 124 have legs shaped to embrace the pellets so that, when lowered, the stop plates 124 do not impede pellet motion but, when raised, they lift the pellets upwardly and into contact with the underside of the support 114. In this way, raising of a pellet against the support 114 halts its movement and, because the distance it is raised is only a fraction of the pellet diameter, all of the pellets following the raised pellet are also blocked.

In use, the pellet gates 106 are used to accumulate pellets in the lanes 24, 26, 28, 80 and 82 and release them under the control of the unit 18. The pellet stops 108 are used under the control of unit 18 to determine the number of pellets released each time the associated pellet gate 106 is opened. Thus, for example, where a lane has two pellet stops 108, the downstream stop 108 may be used to stop the first pellet following the leading pellet so that only the latter is released when the pellet gate 106 is opened. The upstream stop may be used to stop the second pellet following the leading pellet so that if desired the leading and next following pellet may be released by appropriate operation of the pellet gate 106 and the downstream pellet stop 108 while the remaining pellets in that lane are held up by the upstream stop. After the leading two pellets have been released, the gate 106 may be closed and the upstream stop 108 operated to allow the remaining pellets to move up to the gate 106 in readiness for the next pellet-releasing operation which may involve the release of one or two pellets.

Although the invention has been described herein with particular reference to the formation of stacks of nuclear pellets where the acceptability of the stack for subsequent loading into a fuel pin sheath is based on a length criterion, it will be understood that a weight criterion may be employed alternatively in which case the references to measuring length should be read as referring to weight. The invention also has application to articles other than nuclear fuel pellets.

We claim:
1. Apparatus for conveying articles in a line comprising continuously-operating conveying means and means for arresting movement of the articles while the con- veying means continues to operate, the arresting means comprising at least one stop element disposed above the conveying means, each such stop element being operable to engage an article in said line and being arranged for movement towards and away from the conveying means between an inoperative position where movement of the article is not impeded and an operative position where the article is lifted from the conveying means into engagement with a surface overlying the conveying means thereby arresting movement of that article and the trailing articles.

2. Apparatus as claimed in claim 1 in which the or each stop element straddles an article and defines an opening through which the articles can pass when the stop element is inoperative, the arrangement being such that, when the stop element is operative, the opening is displaced upwardly relative to the direction of conveyor feed thereby displacing an article received in said opening upwardly against said surface.

3. A selector mechanism for controlling transfer of articles from a plurality of upsptream feed lines to at least one downstream article-receiving station, said selector mechanism comprising a plurality of transfer passages each for registry with a respective upstream feed line, a plurality of selectively operable gate elements each associated with a respective transfer passage to block or unblock movement of the leading article from each feed line, and at least one stop element associated with at least one of said transfer passasges and located upstream of the respective gate element, the or each stop element being disposed above the transfer passage, operable selectively to engage and release a trailing article and arranged for movement between an inoperative position where movement of the trailing article is not impeded and an operative position where the trailing article is lifted into engagement with a surface overlying the transfer passage whereby feed of the trailing article so engaged and the article upstream thereof can be interrupted while the corresponding gate element is operated to unblock the leading article for movement to said at least one article-receiving station.

4. A selector mechanism as claimed in claim 3 in which each stop element straddles an article and includes an opening through which the articles can pass when the stop element is inoperative, the arrangement being such that, when the stop element is operative, the opening is displaced upwardly relative to the direction of feed movement of the articles thereby displacing an article received in the opening upwardly against said surface.

5. A selector mechanism as claimed in claim 3 in which at least one of the transfer passages is provided with more than one stop element spaced apart in the direction of feed movement so as to be co-operable with different trailing articles.

6. A selector mechanism for controlling transfer of articles from a plurality of usptream feed lines to at least one downstream article-receiving station, said selector mechanism comprising a plurality of transfer passages each for registry with a respective upstream feed line, a plurality of selectively operable gate elements each associated with a respective transfer passage to block or unblock movement of the leading article from each feed line, and at least one stop element associated with at least one of said transfer passages and located upstream of the respective gate element, the or each stop element being operable selectively to engage and release a trailing article whereby feed of the trailing article so engaged and the articles upstream thereof can be interrupted while the corresponding gate element is operated to unblock the leading article for movement to said at least one article-receiving station, each stop element being operable to engage the articles and urge the same against a surface to arrest feed movement of an article and those articles following the article so engaged, each stop element including an opening through which the articles can pass when the stop element is inoperative, the arrangement being such that, when the stop element is operative, the opening is displaced laterally relative to the direction of feed movement of the articles thereby displacing an article received in the opening laterally against said surface.

7. A selector mechanism as claimed in claim 6 in which each element is of bifurcated configuration.

8. Apparatus for controlling transfer of articles from a plurality of upstream feed lines to at least one downstream article-receiving station, said apparatus comprising a plurality of transfer passages each for registry with a respective upstream feed line, a conveyor element running beneath and common to the transfer passages, and a plurality of stop elements each disposed above a respective transfer passage, each stop element being operable to engage an article on the conveyor element and being arranged for movement towards and away from said common conveyor element between an inoperative position where movement of the article is not impeded and an operative position where the article is lifted form the conveyor element into engagement with a surface overlying the conveyor element thereby arresting movement of that article and any trailing articles.

9. Apparatus as claimed in claim 8 in which each transfer passage is provided with a selectively operable gate element disposed above the conveyor element and located downstream of the stop element such that the gate element is operable to block and unblock movement of the leading article from each feed line and the stop element is operable to arrest movement of a trailing article so that feed of the trailing article and the articles upstream thereof can be interrupted while the corresponding gate element is operated to unblock the leading article for movement to said at least one article receiving station.

* * * * *